(12) United States Patent
Ujii et al.

(10) Patent No.: US 8,344,883 B2
(45) Date of Patent: Jan. 1, 2013

(54) INPUT APPARATUS AND INPUT METHOD

(75) Inventors: Junichi Ujii, Kanagawa (JP); Megumi Kuwabara, Kanagawa (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 13/265,738

(22) PCT Filed: Apr. 23, 2010

(86) PCT No.: PCT/JP2010/002966
§ 371 (c)(1),
(2), (4) Date: Oct. 21, 2011

(87) PCT Pub. No.: WO2010/122815
PCT Pub. Date: Oct. 28, 2010

(65) Prior Publication Data
US 2012/0032801 A1 Feb. 9, 2012

(30) Foreign Application Priority Data

Apr. 24, 2009 (JP) .................................. 2009-106749

(51) Int. Cl.
*G08B 21/00* (2006.01)
(52) U.S. Cl. .......................... 340/540; 345/168; 345/173
(58) Field of Classification Search ................... 340/540, 340/665; 178/18.01, 19.04; 345/168, 173, 345/174, 175
See application file for complete search history.

(56) References Cited

U.S. PATENT DOCUMENTS

| 6,603,708 | B2 * | 8/2003 | Tamagawa et al. | 345/168 |
| 6,831,631 | B2 * | 12/2004 | Chuang | 345/173 |
| 7,417,625 | B2 * | 8/2008 | Morris | 345/169 |
| 7,973,777 | B2 * | 7/2011 | Lee et al. | 345/175 |
| 7,973,778 | B2 * | 7/2011 | Chen | 345/175 |
| 2011/0102326 | A1 * | 5/2011 | Casparian et al. | 345/168 |

FOREIGN PATENT DOCUMENTS

| JP | 04-369976 A | 12/1992 |
| JP | 2005-108036 A | 4/2005 |
| JP | 2005-352927 A | 12/2005 |
| JP | 2006-134609 A | 5/2006 |
| JP | 2006-039745 A | 2/2009 |

OTHER PUBLICATIONS

International Search Report; PCT/JP2010/002966; Jul. 13, 2010.

* cited by examiner

*Primary Examiner* — John A Tweel, Jr.
(74) *Attorney, Agent, or Firm* — Studebaker & Brackett PC; Donald R. Studebaker

(57) ABSTRACT

An input apparatus capable of receiving inputs of a plurality of levels in accordance with pressure loads varied in each operation by an operator and an input method using such an input apparatus are provided. An input apparatus 10 for receiving inputs of a plurality of levels in accordance with pressure loads has a load detection unit 40 configured to detect a pressure load of a pressing input and a control unit 20 configured to control such that a second load standard for receiving a second level input is set whenever the load detection unit 40 detects a pressure load satisfying a first load standard for receiving a first level input.

17 Claims, 8 Drawing Sheets

FIG. 2
(A)
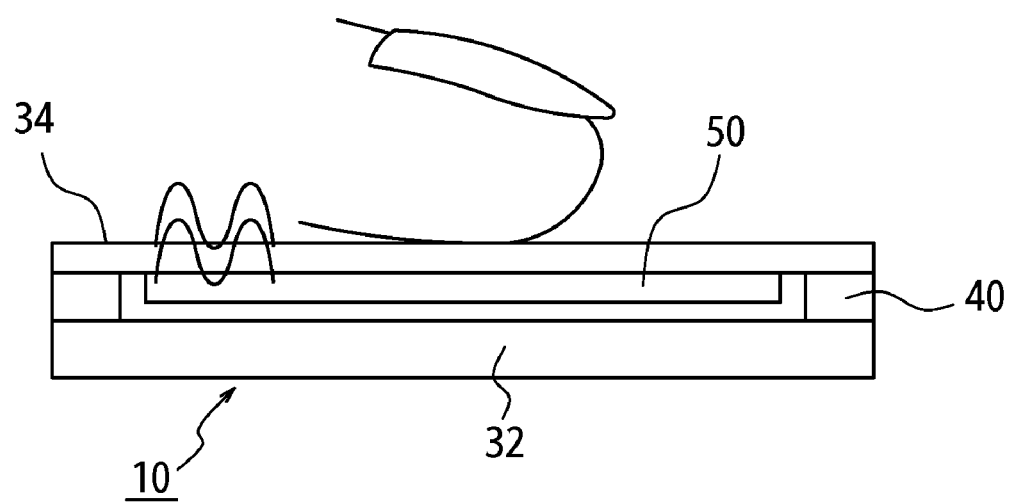
(B)
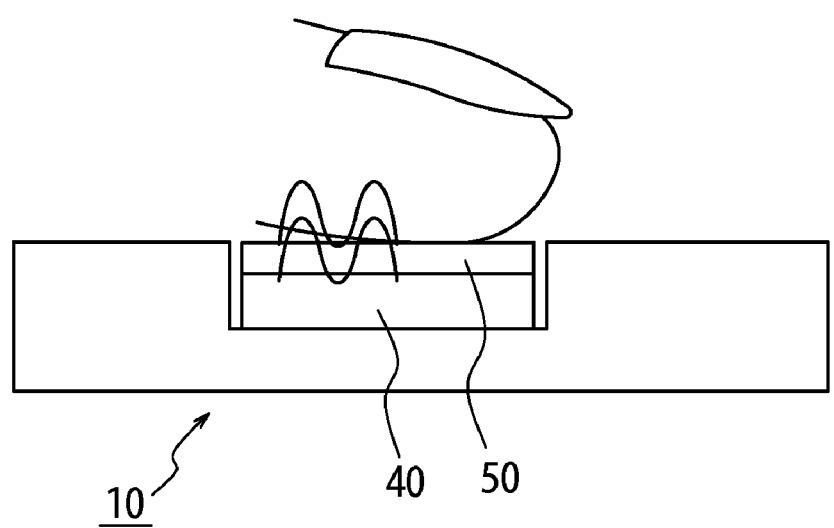

FIG. 4
(A)
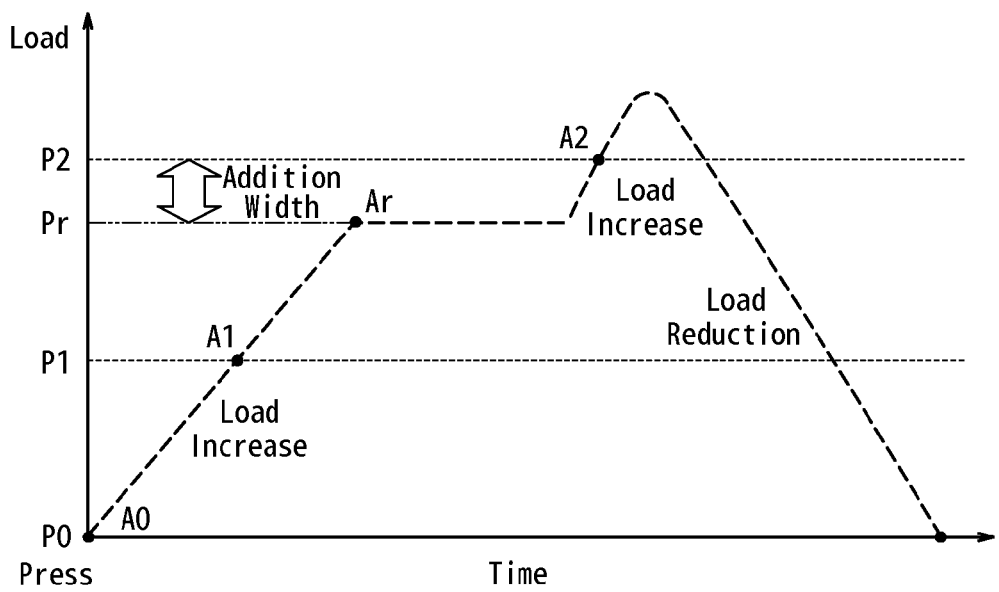
(B)
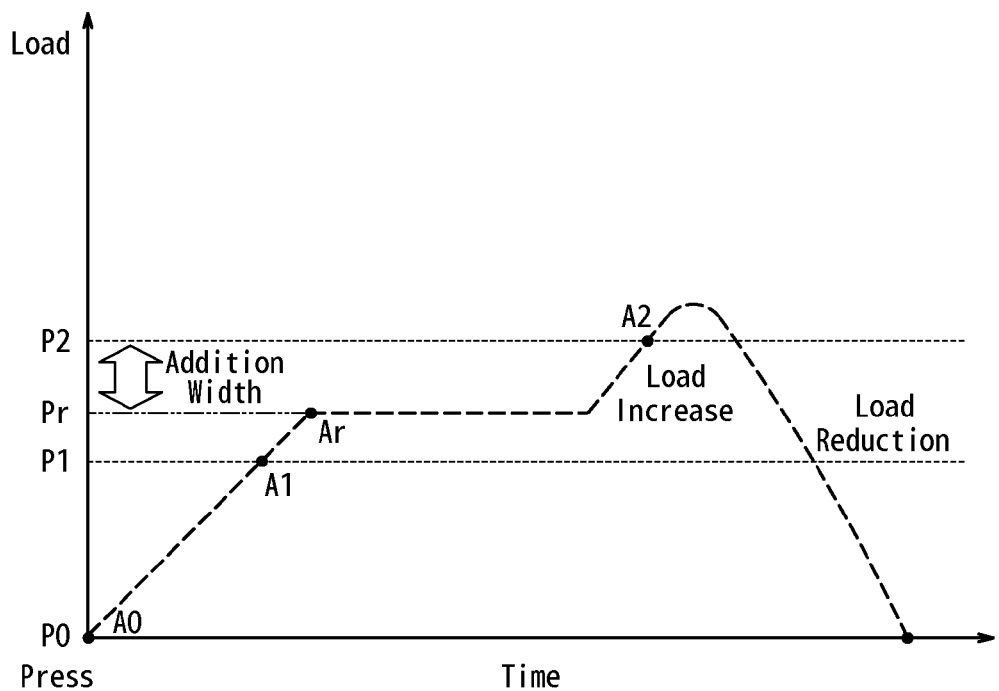

FIG. 5
(A)
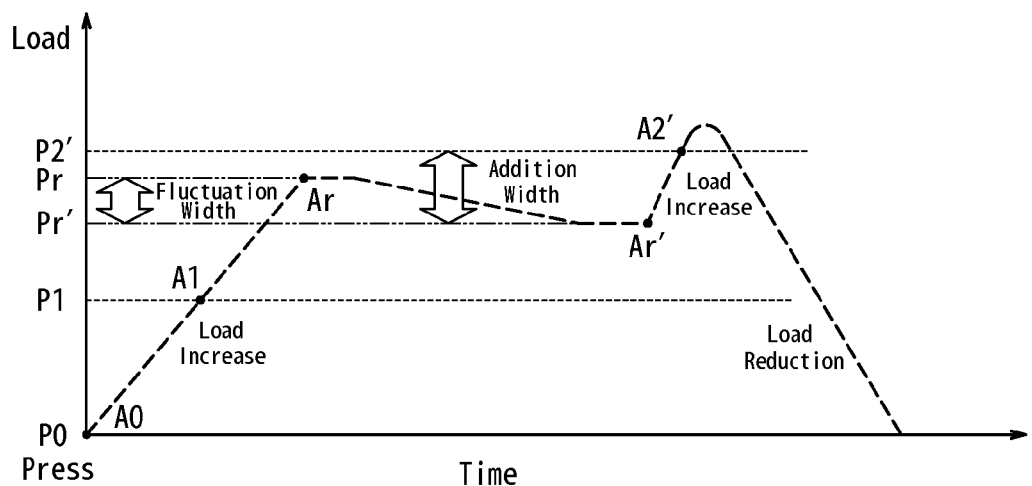
(B)
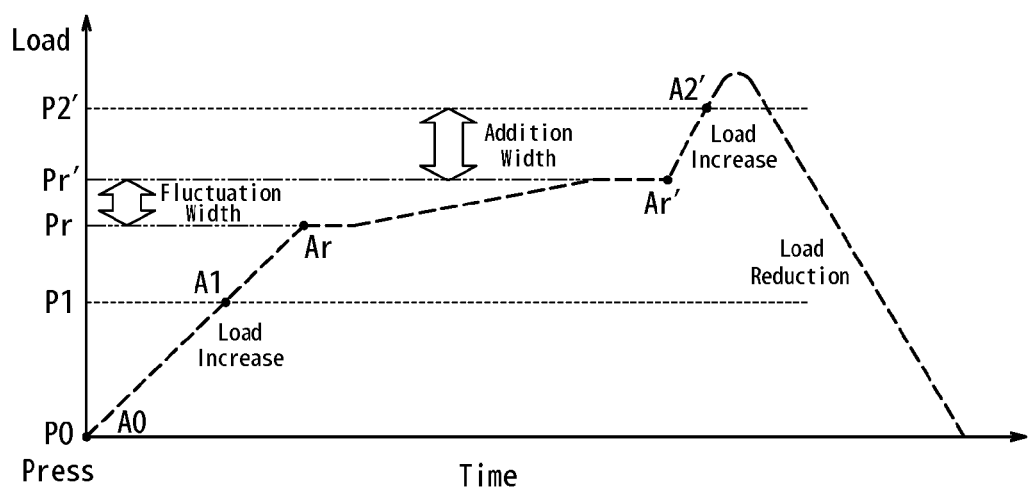

INPUT APPARATUS AND INPUT METHOD

CROSS REFERENCE TO RELATED APPLICATION

This application claims priority to and the benefit of Japanese Patent Application No. 2009-106749 filed on Apr. 24, 2009, the entire contents of which are incorporated herein by reference.

TECHNICAL FIELD

The present invention relates to input apparatuses and input methods, and more specifically, to input apparatuses for receiving inputs of a plurality of levels in accordance with pressure loads, and to input methods using such input apparatuses.

BACKGROUND ART

Conventionally, a variety of electronic devices including mobile phones and digital cameras use a mechanical switch in general, such as a tact switch or a membrane switch, which serves as the input apparatus for allowing an operator to perform input operations. These days, especially, it is often the case that small terminal devices are equipped with multiple functions, and such terminal devices have housing with keys and buttons constituted of various switches on a surface thereof.

Generally, such a switch is assigned a single operation (or function based on a program or the like). For example, the mobile phone outputs a number corresponding to a key upon detection of a pressing input to a numerical keypad, or displays a menu panel upon detection of the pressing input to a menu key.

However, carrying out a plurality of operations in series with different switches assigned respective operations may result in a substantially troublesome task. Although it may be considered to arrange such that, by using a single switch, a plurality of operations are carried out sequentially whenever an input to the switch is detected, such an input method requires predefinition of an order of the operations. Therefore, it is not capable of immediately carrying out arbitrary operations desired by the operator.

In order to address the above problem, there has been suggested an input apparatus capable of assigning a plurality of operations to a switch in accordance with an input state to the switch (for example, see Patent Document 1).

The input apparatus described in Patent Document 1 can receive inputs of two levels in accordance with the pressure loads applied when the operator performs the input operation.

FIG. 8 is a cross-sectional view illustrating a schematic internal structure of an operation apparatus 100 described in Patent Document 1. As shown in FIG. 8, the operation apparatus 100 has a first detection unit 200 and a second detection unit 300, both of which are constituted of membrane switches. The second detection unit 300 is arranged (in a pressing direction by the operator) under the first detection unit 200. An area to be directly contacted by a finger F of the operator is made of a flexible member. In this way, the plastic member bends under the pressure on the operation apparatus 100 by the operator, thereby conveying the pressure load to the first detection unit 200. On the operation apparatus 100, when the operator presses down a position corresponding to a first contact point S3, applying a light weight (first operation force) with the finger F, a first upper conductive portion 201c and a first lower conductive portion 202c come into contact with each other, allowing for conduction of the first contact point S3. This is defined as a first level input. On the operation apparatus 100, further, when the finger F presses down applying a heavier weight (second operation force), a second upper conductive portion 301c and a second lower conductive portion 302c come into contact with each other, allowing for conduction of a second contact point T3. This is defined as a second level input. FIG. 8 shows a state that the first contact point S3 detects the first level input, and the second contact point T3 also detects the second level input as the operator's finger F presses the operation apparatus 100 applying the second operation force.

Since such an input apparatus receives inputs of two levels in accordance with the pressure loads of the operator's input, different operations can be assigned to respective levels. Such an input apparatus allows the operator to separately perform a plurality of inputs by adjusting the pressure on one switch (input apparatus) in a single input operation, a pressing input to the switch.

That is, such an input apparatus for receiving inputs of two levels enables the operator to perform the first level input by maintaining light pressure on the button. This input state is called "halfway pressing", and referred to as the "first level input" hereinafter. This input apparatus also enables the operator to perform the second level input by pressing the button with pressure heavier than the first level input. This input state is called "full pressing", and referred to as the "second level input" hereinafter.

A shutter button of a camera is an example of typical application of the input apparatus as the mechanical switch for receiving inputs of two levels in accordance with the pressure loads. In general, for the mobile phones and the like having a digital camera function, the "halfway pressing" for the first level input by the operator allow to turn on functions for adjusting AE (Auto Exposure) and AF (Auto Focus). If the operator inputs with the "full pressing" for the second level input in this state, the shutter is released. Accordingly, the above mechanical switch can be assigned different operations for the first level input and the second level input, and thus the operator can separately operate the different operations as desired.

It is to be noted that the input apparatus for receiving inputs of a plurality of levels in accordance with the pressure loads is not limited to the mechanical switch. For example, there has been suggested a touch panel type input apparatus, a combination of a display unit and a position input device, for receiving inputs of a plurality of levels in accordance with the pressure loads by software processing (for example, see Patent Document 2).

The touch panel type input apparatus described in Patent Document 2 has a position detection unit for detecting a position of a pressing operation on the touch panel provided on a screen of the display unit, and a pressure detection unit for detecting a pressing force applied on the touch panel. This input apparatus is capable of receiving inputs of two systems, an input in accordance with a position detected by the position detection unit and multi-level inputs in accordance with the pressure detected by the pressure detection unit, in one pressing operation of the touch panel by the operator.

That is, with this input apparatus, the operator can simultaneously perform both an input of a first system in accordance with a position of the pressing operation and an input of a second system in accordance with a pressure on the touch panel at that time, by performing the pressing operation to the touch panel on the screen. At this time, the input apparatus can receive multiple levels of selections, i.e., three or more levels of selections in accordance with the pressure on the touch panel. Accordingly, the operator can perform an input of the two systems at once in a single pressing operation of the touch panel, which enables reduction in the number of pressing operations.

As stated above, both of the input apparatus using the mechanical switch and the input apparatus using the touch panel can receive inputs of a plurality of levels in accordance with the pressure loads. Those input apparatuses allow collection of a plurality of functions to one button or key by classifying inputs into a plurality of levels in accordance with the pressure loads. Thereby, it is possible to reduce the number of keys and buttons for input operations. Especially for small terminals such as the mobile terminals, there is a difficulty in arranging numerous keys and buttons on their bodies due to a small size of their housings. Accordingly, if the mobile terminal can separately perform a plurality of functions with a small number of keys and buttons, it can advantageously reduce the keys and buttons necessary on the terminal body.

PRIOR ART DOCUMENTS

Patent Documents

Patent Document 1: JP 2006-134609 A
Patent Document 2: JP 2006-039745 A

SUMMARY OF INVENTION

Technical Problem

For the operation apparatus 100 described in Patent Document 1, however, specifications such as an arrangement of each of the membrane switch of the first detection unit 200 and the membrane switch of the second detection unit 300 are predefined at a time of designing or manufacture. In addition, flexibility of the member constituting the membrane switch is determined at the time of manufacture of products. Therefore, it is generally difficult to change such specifications afterward.

Accordingly, with such an input apparatus, the only way for the operator to find out how heavy pressure load is needed for the first level input or the second level input is to learn in a sensual way by actually performing input operations. That is, each operator must adjust his/her pressure to predetermined pressure loads required by the input apparatus.

Typically, detailed works and delicate pressure adjustments with hands (or fingertips) considerably vary between individual operators who are good at them and who are not. Accordingly, an input operation which can be performed by light-fingered operators without difficulty does not necessarily mean that it can be immediately dealt by all ordinary operators.

Therefore, despite an intention to perform the first level input alone to the input apparatus, some operators may inadvertently press the button or the key with excessive pressure loads, as incapable of a delicate adjustment, resulting in performing the second level input. Since a level of the pressure load in applying pressure is invisible, it is difficult for the operators to know exactly how heavy the pressure load is needed to perform the input of each level.

The same circumstance applies to the above Patent Document 2. The touch panel type input apparatus described in Patent Document 2 requires presetting of thresholds of pressure loads to be received by the pressure detection unit in order to separately receive inputs of a plurality of levels in accordance with the pressure loads. Therefore, each operator must adjust his/her pressure to the predetermined pressure load required by the input apparatus. As a result, this input apparatus still leaves the problem unsolved that, despite the intention to perform the first level input alone to the input apparatus, some operators may inadvertently press the button or the key with excessive pressure loads, as incapable of a delicate adjustment, resulting in performing the second level input.

The touch panel type input apparatus described in the Patent Document 2 does not use the mechanical switch, and is thus capable of control in a software-like manner by a control unit based on the pressure load received by the pressure detection unit. Accordingly, it is considered that, with this input apparatus, a change of the threshold for the pressure detection unit to receive the pressure load can be made afterward by an alteration of a setting by the control unit.

However, resetting the threshold for the pressure detection unit to receive the pressure load for each operator is an extremely cumbersome task. In addition, even for the same operator, the pressure load of the input operation normally varies according to time and circumstances of the operation. Accordingly, this input apparatus also cannot solve the problem that, despite the intention to perform the first level input to the input apparatus, some operators may inadvertently press the button or the key with excessive pressure load, resulting in performing the second level input.

For an unintended input by the operator, although the input apparatus performs an operation following a predetermined legitimate procedure, such an operation based on an inadvertent input by the operator is nothing but a malfunction for the operator. When the above input apparatus is applied to the shutter button of the camera, for example, the shutter is released before appropriate operations by functions for AE and AF if the second level input is received at once skipping the first level input due to lack of an appropriate adjustment of the pressure by the operator. As a result, because of absence of appropriate operations by the functions for AE and AF, the camera may capture an out-of-focus image. In addition, if processing to adjust something is carried out in accordance with the pressure detected by the input apparatus as described above, or if staged processing are assigned in accordance with the pressures, it is assumed that an operation unintended by the operator may be disadvantageously performed upon reception of the second level input at once by the input apparatus.

Accordingly, it is an object of the present invention, in consideration of the above circumstances, to provide an input apparatus capable of receiving inputs of a plurality of levels in accordance with the pressure loads based on pressure loads varied between operations by an operator, and an input method using such an input apparatus.

Solution to Problem

In order to achieve the above object, the present invention according to claim 1 is an input apparatus for receiving inputs of a plurality of levels in accordance with pressure loads, including:

a load detection unit configured to detect a pressure load of a pressing input; and a control unit configured to control to set a second load standard for receiving a second level input whenever the load detection unit detects a pressure load satisfying a first load standard for receiving a first level input.

The invention according to claim 2 is the input apparatus according to claim 1, wherein the control unit sets the second load standard for receiving the second level input based on a pressure load detected by the load detection unit after the first load standard is satisfied.

The invention according to claim 3 is the input apparatus according to claim 1 or 2, further including a load variation rate calculation unit configured to calculate a temporal variation rate of the pressure load detected by the load detection unit, wherein the control unit sets the second load standard based on the pressure load at a time when the variation rate of the pressure load is first reduced down to a predetermined value or lower after detection of the pressure load satisfying the first load standard by the load detection unit.

The invention according to claim 4 is the input apparatus according to claim 1 or 2, further including a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein the control unit sets the second load standard based on the pressure load at a time when the variation rate of the pressure load in a predetermined period, after detection of the pressure load satisfying the first load standard by the load detection unit, is reduced down to be lower than the average variation rate by a predetermined value or more.

The invention according to claim 5 is the input apparatus according to claim 1 or 2, further including a load variation rate calculation unit configured to calculate, at predetermined intervals, a temporal variation rate of the pressure load detected by the load detection unit, wherein the control unit sets the second load standard based on a pressure load at a time when the variation rate of the pressure load in a first predetermined period after detection of the pressure load satisfying the first load standard by the load detection unit is reduced down to be lower than the variation rate of the pressure load in a second predetermined period immediately before the first predetermined period by a predetermined value or more.

The invention according to claim 6 is the input apparatus according to claim 1 or 2, further including a load variation rate calculation unit configured to calculate a temporal variation rate of the pressure load detected by the load detection unit, wherein the control unit sets the second load standard based on a pressure load at a time when the variation rate of the pressure load after detection of the pressure load satisfying the first load standard by the load detection unit is increased up to a second predetermined value or higher after being reduced down to a first predetermined value or lower.

The invention according to claim 7 is the input apparatus according to claim 1 or 2, further including a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein the control unit sets the second load standard based on a pressure load at a time when the variation rate of the pressure load in a predetermined period after detection of the pressure load satisfying the first load standard by the load detection unit is increased, after being reduced down to the first predetermined value or lower, such that a difference from the average variation rate becomes equal to or less than a second predetermined value.

The invention according to claim 8 is the input apparatus according to claim 1 or 2, further including a load variation rate calculation unit configured to calculate, at predetermined intervals, a temporal variation rate of the pressure load detected by the load detection unit, wherein the control unit sets the second load standard based on a pressure load at a time when the variation rate of the pressure load in a first predetermined period after detection of the pressure load satisfying the first load standard by the load detection unit is increased to be higher than the variation rate of the pressure load in a second predetermined period immediately before the first predetermined period by a second predetermined value or more after being reduced down to a first predetermined value or lower.

The invention according to claim 9 is the input apparatus according to claim 1 or 2, further including a notification generation unit configured to generate notification information using at least one of sound, vibration and display, wherein the control unit controls the notification generation unit to generate the notification information when the pressure load detected by the load detection unit satisfies the first load standard.

The invention according to claim 10 is an input method using an input apparatus for receiving inputs of a plurality of levels in accordance with pressure loads, including the steps of:

detecting a pressure load of a pressing input; and controlling to set a second load standard for receiving a second level input whenever a pressure load satisfying a first load standard for receiving a first level input is detected at the step of detecting the pressure load.

Effect of the Invention

According to the input apparatus and the input method of the present invention, the second load standard for receiving the second level input is set whenever the load detection unit detects the pressure load satisfying the first load standard for receiving the first level input. That is, the input apparatus according to the present invention sets a standard value of the pressure load for receiving the second level input, every time an operator performs an operation. According to the present invention, the input apparatus can receive inputs of a plurality of levels in accordance with pressure loads based on the pressure different in each operation by the operator. It thereby solves a problem that the operator, despite his/her intention to perform the first level input alone, inadvertently performs the second level input at once by applying an excessive pressure load on the input apparatus.

BRIEF DESCRIPTION OF DRAWINGS

FIGS. 2A and 2B are diagrams illustrating examples of mounting structures of each function unit in the input apparatus according to the first embodiment;

FIGS. 4A and 4B show graphs showing variations in a pressure load detected by a load detection unit of the input apparatus according to the first embodiment;

FIGS. 5A and 5B show graphs showing variations in a pressure load detected by the load detection unit of the input apparatus according to a fourth embodiment;

DESCRIPTION OF EMBODIMENTS

Embodiments of the present invention will be described with reference to the accompanying drawings. The following description of embodiments assumes that the input apparatus according to the present invention is a mobile terminal having a touch panel, such as a mobile phone, a PDA or the like, for example. However, the input apparatus according to the present invention is not limited to the mobile terminal but may be a terminal with an input apparatus, such as a digital camera, a portable audio player, a notebook computer and a mini laptop, for example. In addition, the input apparatus according to the present invention is not necessarily limited to the mobile terminal but may be any terminal with an input apparatus, such as an ATM machine of a bank and a ticket machine at a train station. Further, the input apparatus according to the present invention is not limited to a terminal having a touch panel, as described below. The present invention is applicable to any input apparatus having a touch panel or switches such as push buttons (or keys) for receiving an input operation by an operator as well as a function to detect a pressure load applied on the switch.

First Embodiment

Figure 1:
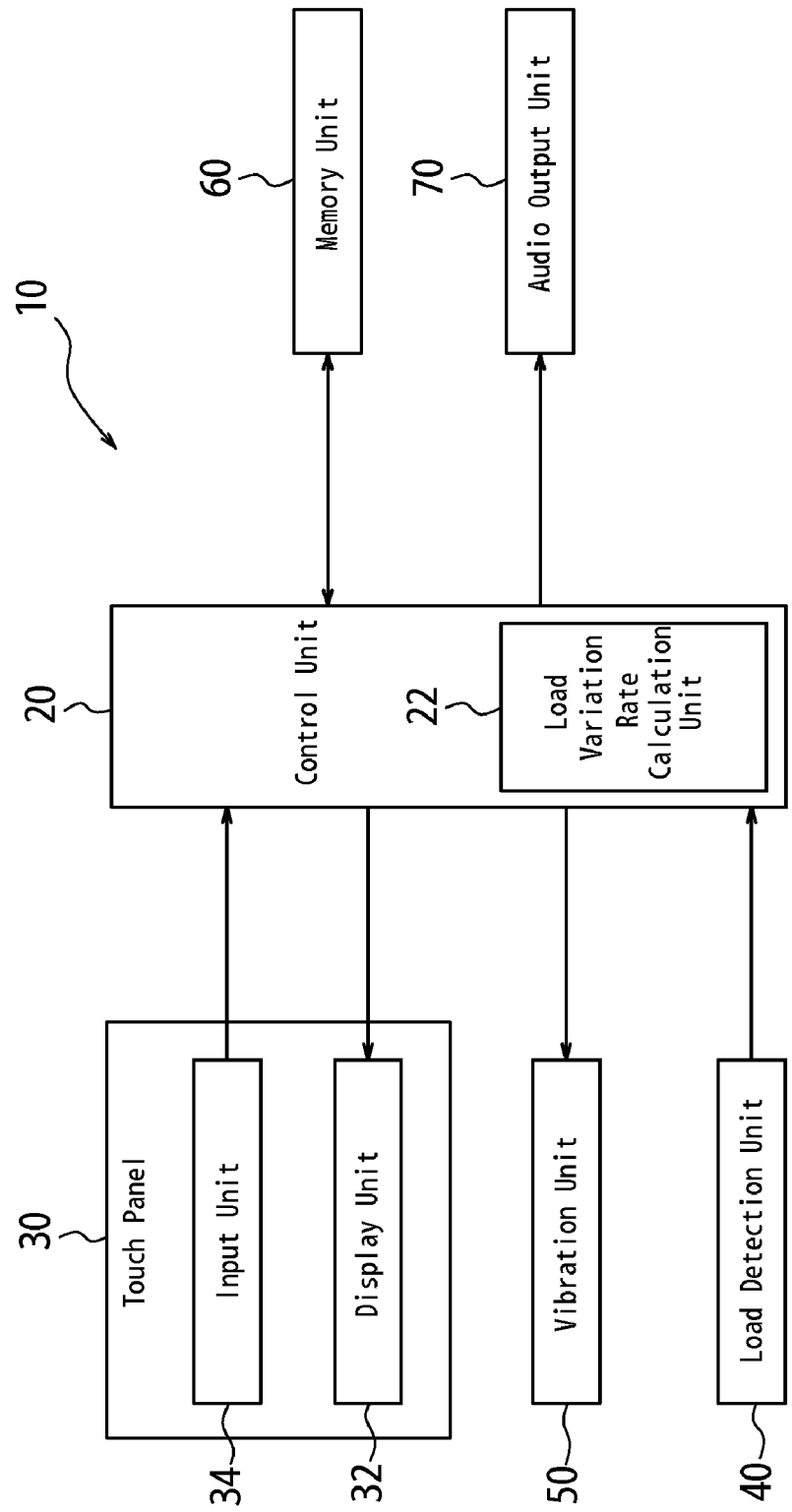
FIG. 1 is a functional block diagram illustrating a schematic internal configuration of an input apparatus according to a first embodiment.

FIG. 1 is a functional block diagram illustrating a schematic internal configuration of an input apparatus 10 according to the present embodiment. As shown in FIG. 1, the input apparatus 10 has a control unit 20, a touch panel 30, a load detection unit 40, a vibration unit 50, a memory unit 60 and an audio output unit 70.

The control unit 20 controls and manages entire mobile terminal 10 including each functional block thereof. The control unit 20 has a load variation rate calculation unit 22 for calculating a temporal variation rate of the pressure load detected by the load detection unit 40 using arithmetic processing.

According to the present embodiment, the touch panel 30 has a display unit 32 and an input unit 34. The touch panel 30 is constituted by arranging the input unit 34 for receiving an input by the operator on the front side of the display unit 32 in an overlapping manner.

The display unit 32 of the touch panel 30 may be, for example, a liquid crystal display (LCD) or an organic EL display. The display unit 32, in addition to a display according to each application, displays a graphical image of a user interface (GUI) composed of various keys and buttons in a predetermined display area, for receiving input operations to the input unit 34 by the operator. Such a graphical image of various keys and buttons displayed on the display unit 32, allowing for operator's visual recognition, in order to receive the input operation to the input unit 34 of the touch panel 30 by the operator, is simply referred to as an "object", hereinafter. When in use as the user interface of the touch panel 30, the display unit 32 displays objects associated with operations, such as the keys, push buttons or a slide lever.

The input unit 34 constituted of a matrix switch or the like for receiving an input by the operator with a finger or the like is arranged on the front surface of the display unit 32. By detecting (receiving) the input by a contact (pressure) by the operator with a fingertip or the like, the input unit 34 outputs a signal corresponding to a position where the input is detected. The input unit 34 is made from a transparent member, which enables the display unit to show the display at least in part. Thereby, the touch panel 30 can receive the input operation by the operator and display a variety of information, such as a result of the input, based on each application.

The load detection unit 40 may be a strain gauge sensor, for example, for detecting the pressure load on the touch panel 30 (or the input unit 34). The load detection unit 40 detects the pressure load of a pressing input when the operator performs input operation.

The vibration unit 50 may be, for example, a piezoelectric transducer or an ultrasonic transducer for conveying vibration to the touch panel 30 (or the input unit 34). The vibration unit 50 may convey vibration thereof to an operator's finger or the like pressing the input unit 34. With such vibration, the input apparatus 100 can inform the operator of a normal reception of an input when the input of the operation is performed on the touch panel 30. That is, the vibration unit 50 serves as a notification information generation unit according to the present embodiment. Predetermined information (for example, a vibration signal) capable of informing the user through generation of vibration by the vibration unit 50 serving as the notification information generation unit is referred to as "notification information", hereinafter.

The memory unit 60 stores various applications and input information, as well as serving as a work memory. Particularly in the present embodiment, the memory unit 60 temporarily stores the pressure load of the pressing input by the operator detected by the load detection unit 40 and the temporal variation rate of the pressure load calculated by the load variation rate calculation unit 22 so that the control unit 20 processes them.

Thereby, with tiered thresholds set for the pressure load detected by the load detection unit 40, the input apparatus 10 can receive inputs of a plurality of levels in accordance with the pressure loads of the input operations by the operator.

The audio output unit 70 may be a buzzer or a speaker, and under control of the control unit 20, generates sound which the operator can recognize auditorily. That is, the audio output unit 70 can convey audio information to the operator pressing the input unit 34 by outputting predetermined sound. The sound output from the audio output unit 70 may be used in place of, or together with, vibration as the notification information generated by the vibration unit 50. Generating sound as well as vibration, the input apparatus 10 can more assuredly inform the operator of the normal reception of an input when the input is performed to the touch panel 30 by the operator.

FIG. 2(A) shows an example of a mounting structure of the touch panel 30, the load detection unit 40 and the vibration unit 50 of the mobile phone 10 shown in FIG. 1. FIG. 2(A) is a cross-sectional view of a main section of the input unit 10.

FIG. 2(A) shows a state that, in order to press the graphical image of an object displayed on the display unit 32 such as a button, the operator is pressing the input unit 34 at a position where the object is displayed on the display unit 32 by using a finger. By detecting a pressure of an input by the operator's finger, the input unit 34 detects a position of the pressing input. The load detection unit 40 detects a force pressing the input unit 34 by the operator. Therefore, the load detection unit 40 is disposed to support the input unit 34 so that the pressure load on the input unit 34 is conveyed to the load detection unit 40. The vibration unit 50 provides the operator's finger with vibration at a proper time based on the pressure load detected by the load detection unit 40. Therefore, the vibration unit 50 is disposed in contact with the input unit 34, for example, to be able to convey vibration to the input unit 34. Vibration generated by the vibration unit 50 is controlled by the control unit 20 based on the pressure load detected by the load detection unit 40. Such a control by the control unit 20 will be discussed below.

It is appreciated that the input apparatus according to the present invention is not limited to an apparatus with the touch panel, as described above. FIG. 2(B) shows an example of a mounting structure of the input apparatus 10 without the touch panel according to the present invention. FIG. 2(B) is a cross-sectional view of a main part of the input apparatus 10 having no touch panel.

As shown in FIG. 2(B), the input apparatus 10 does not have the display unit 32, as not having the touch panel. However, if required to display information such as a result of an input, the input apparatus 10 may have a separate display unit. With the input unit 10 shown in FIG. 2(B), accordingly, the operator performs the pressing input by pressing an actual button or key, instead of the input (pressing input) by pressing the object displayed on the display unit. In such a configuration without the input unit 34, the load detection unit 40 may serve as the input unit 34 as well. In this case, that is, it may be regarded that an input to the input unit 34 is ON if the load detection unit 40 detects the pressure load, whereas it may be regarded that an input to the input unit 34 is OFF if the load detection unit 40 does not detect the pressure load.

In the example shown in FIG. 2(B), the load detection unit 40 is arranged inside a concave portion of a housing (base member) of the input apparatus 10, and the vibration unit 50 is arranged on the top of the load detection unit 40. In this way, the vibration unit 50 can directly receive the pressing input by the operator at an upper surface thereof, while the load detection unit 40 can detect the pressure load of the pressing input received by the vibration unit 50. Based on the pressure load detected by the load detection unit 40, the vibration unit 50 directly provides the operator's finger with vibration at a proper time. In this case, the upper surface of the vibration unit 50 operates in a similar manner as the buttons or the keys. Therefore, the vibration unit 50 may be in the form of a key top of the button, and by specifying a function or the like of the button on the key top, it is possible to show the function.

It is appreciated that the input apparatus 10 having no touch panel is not limited to the structure as shown in FIG. 2(B). According to the present embodiment, all necessary function units responsible for an input to the input unit 10 are, at least, the load detection unit 40 for detecting the pressure load of the pressing input by the operator and the vibration unit 50 to serve as the notification information generation unit for generating vibration as the notification information for the operator. Therefore, it is possible to implement the function unit responsible for the input to the input apparatus according to the present invention by adding the load detection unit 40 and the vibration unit 50 to a conventional mechanical switch, or by using a conventional switch having functions as them.

Figure 3:
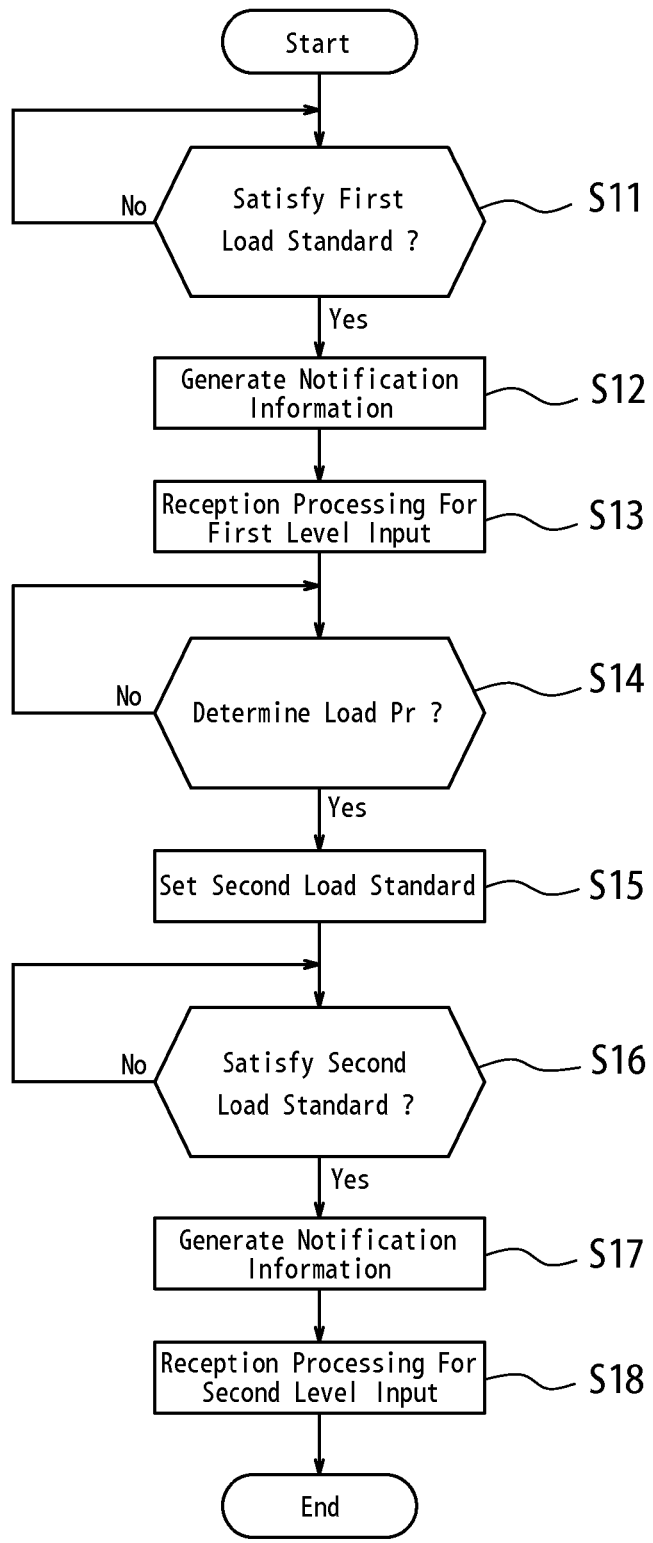
FIG. 3 is a flowchart illustrating an input reception process by the input apparatus according to the first embodiment.

Next, input reception processing by the input apparatus 10 according to the present embodiment will be described. FIG. 3 is a flowchart illustrating the input reception processing by the input apparatus 10 according to the present embodiment. According to the present embodiment, it is assumed that, when the input reception processing is carried out by the input apparatus 10, the operator of the input apparatus 10 knows that the input apparatus 10 receives inputs of at least two levels, i.e., inputs of a plurality of levels in accordance with the pressure loads.

The control unit 20 of the input apparatus 10 monitors whether the load detection unit 40 has detected the pressure load in response to the pressing input to the input unit 34 by the operator. The input reception processing by the input apparatus 10 starts when the load detection unit 40 detects the pressure load. When the input apparatus 10 starts the input reception processing, the control unit 20 determines whether the load detection unit 40 has detected the pressure load satisfying a first load standard for receiving a first level input as the operator increases the pressure load of the pressing input (step S11).

The first load standard for receiving the first level input is a predetermined criterial threshold of the pressure load. If the load detection unit 40 detects the pressure load exceeding the threshold, the control unit 20 determines that the first level input defined by the input apparatus 10 is received and performs processing accordingly. Although the first load standard for receiving the first level input is a predetermined pressure load as a threshold, it may be changed afterward as desired by the operator.

If a pressure load satisfying the first load standard for receiving the first level input is not detected at step S11, the input apparatus 10 turns into a waiting state. In contrast, if a pressure load satisfying the first load standard for receiving the first level input is detected at step S11, the control unit 20 controls the notification information generation unit to generate the notification information (step S12). That is, the control unit 20 controls the vibration unit 50 to vibrate in a predetermined manner, according to the present embodiment. When the vibration unit 50 generates vibration, the control unit 20 retrieves information indicative of waveform or the like prestored in the memory unit 60 and controls a mode of the vibration generated by the vibration unit 50. In this manner, the operator can know upon generation of the vibration that the first level input is normally received by the input apparatus 10.

In addition to this processing, the control unit 20 also carries out processing for an operation corresponding to the first level input defined by the input apparatus 10, in response to the reception of the first level input (step S13). If the input apparatus 10 is applied to a shutter button of a camera, for example, the processing at step S13 corresponds to an operation for a "halfway pressing" of the input apparatus 10, i.e., an operation to turn on functions for adjusting AE and AF.

FIG. 4 shows graphs showing variations of the pressure load of the pressing input by the operator detected by the load detection unit 40. An X-axis direction represents the lapse of time, whereas a Y-axis represents the pressure load detected by the load detection unit 40. In FIG. 4(A), a point A0 represents a point when the operator touches the input unit 34 of the touch panel 30, whereas a point P0 represents a pressure load at that time. FIG. 4(A) shows a state that the pressure load detected by the load detection unit 40 is gradually increased after the point A0 as the operator increases the pressure of the input, reaching a first load standard P1 predetermined for receiving a first level input at a point A1.

At this time, recognizing the normal reception of the first level input through generation of the vibration, the operator maintains the pressure of the input (that is, the operator stops increasing the pressure), in an attempt to prevent to perform a second level input at once. Here, any operator can be aware of the normal reception of the first level input with vibration generated. However, the force for maintaining the pressure of the input, applied by the operator after recognizing the reception of the first level input, varies significantly between the operators.

For example, in the graph of the pressure load show in FIG. 4(A), the operator does not reduce the pressure soon after the point A1, where the pressure load reaches the first load standard P1, but instead keeps increasing the pressure and then maintains (not increasing) the pressure at a point Ar. For operators who usually press the buttons hard, it is considered that they maintain the pressing input applying a relatively large force, despite an intention to maintain the pressure immediately after generation of vibration by the vibration unit 50 upon reception of the first level input.

Meanwhile, as shown in the graph of the pressure load in FIG. 4(B), the operator stops increasing the pressure relatively soon after the point A1, where the pressure load reaches the first load standard P1, and then maintains the pressure from the point Ar. For operators who usually press the buttons lightly, it is considered that they maintain the pressure immediately after generation of vibration by the vibration unit 50 upon reception of the first level input.

A comparison between a pressure load Pr at the point Ar shown in FIG. 4(A) and a pressure load Pr at the point Ar shown in FIG. 4(B) shows that the latter one is much smaller than the former. It thus shows that the pressure applied when the operator tries to maintain the pressure of the input after recognizing the reception of the first level input varies widely between the operators. In addition, it is also considered that, even by the same operator, the pressure to maintain the first level input may vary in each operation.

According to the present embodiment, therefore, a second load standard P2 for receiving a second level input is set based on the pressure load Pr at the point Ar where the operator starts maintaining the pressure of the input after recognizing the reception of the first level input. That is, whenever the load detection unit 40 detects a pressure load satisfying the first load standard P1 for receiving the first level input, the control unit 20 sets the second load standard P2 for receiving the second level input based on the pressure load Pr detected by the load detection unit 40 after the first load standard is satisfied. At this time, the second load standard P2 for receiving the second level input is larger than the first load standard P1 for receiving the first level input.

For such processing, the control unit 20 determines the pressure load Pr at the point Ar where the operator starts maintaining the pressure of the input (step S14). According to the present embodiment, the load variation rate calculation unit 22 calculates a temporal variation rate of the pressure load detected by the load detection unit 40. After the load detection unit 40 detects the pressure load satisfying the first load standard, the control unit 20 determines the pressure load Pr adopting the pressure load at a point where the variation rate of the pressure load calculated by the load variation rate calculation unit 22 is first reduced down to a predetermined value or lower at step S14. Accordingly, after the load detection unit 40 detects the pressure load satisfying the first load standard P1, the control unit 20 sets the second load standard P2 based on the pressure load Pr, where the variation rate of the pressure load calculated by the load variation rate calculation unit 22 is first reduced down to the predetermined value or lower.

Here, the "predetermined value" used to determine that the variation rate of the pressure load is reduced to the predetermined value or lower is preferably a small value close to zero, for example, so that the control unit 20 can determine the point Ar where the operator stops increasing the pressure and starts maintaining it. Slops of tangents of curved lines shown in FIG. 4 indicate temporal variation rates of the pressure load detected by the load detection unit 40. According to the present invention, hence, after the point A1 in FIG. 4, where the load detection unit detects the pressure load satisfying the first load standard P1, the pressure load at the point Ar, where the slope of the tangent first becomes close to 0, i.e., where the slope of the tangent becomes nearly parallel to the Y-axis, is determined as the pressure load Pr.

After determination of the pressure load Pr at step S14, the control unit 20 sets the second load standard P2 for receiving the second level input to be a result of adding a value of a predetermined additional width to the pressure load Pr (step S15). As clearly shown by a comparison of FIG. 4(A) and FIG. 4(B), even after addition of the same additional width, the second load standard P2 set in this manner varies based on the pressure load Pr at the point Ar where the operator starts maintaining the pressure of the input.

Subsequently, the control unit 20 determines whether the load detection unit 40 has detected the pressure load satisfying the second load standard for receiving the second level input as the operator increases the pressure load of the pressing input (step S16).

The second load standard for receiving the second level input is a predetermined pressure load (second load standard P2) as a threshold set in the above processing. If the load detection unit 40 detects the pressure load exceeding this threshold after the second load standard is set as described above, the control unit 20 regards that the second level input defined by the input apparatus 10 is received and performs processing accordingly.

If the pressure load satisfying the second load standard for receiving the second level input is not detected at step S16, the input apparatus 10 turns into the waiting state. In contrast, if the pressure load satisfying the second load standard for receiving the second level input is detected at step S16, the control unit 20 controls the notification generation unit to generate the notification information (step S17). That is, the control unit 20 controls the vibration unit 50 to vibrate in a predetermined manner. In this way, the operator can recognize the normal reception of the second level input by the input apparatus 10 upon generation of vibration. Differentiating the notification information for the reception of the second level input from that for the reception of the first level input allows the operator to easily distinguish between the input levels.

Along with the above processing, the control unit 20, upon reception of the second level input, carries out processing corresponding to the second level input defined by the input apparatus 10 (step S18). For example, if the input apparatus 10 is applied to the shutter button of the camera, the process at step S18 corresponds to processing for a "full pressing" of the input apparatus 10, i.e., processing to release the shutter after appropriate operations of the functions for the AE and AF.

According to the present embodiment, as described above, the second load standard for receiving the second level input is set based on the pressure load after the first load standard is satisfied. It thus eliminates a risk for even an operator who has never operated the input apparatus 10 before to perform the "full pressing" at once not knowing a right adjustment. In addition, even if used by a plurality of different operators, the input apparatus 10 sets the second load standard at an appropriate pressure load in accordance with the pressure of the input operation by each of the operators. Therefore, it is needless for each of the operators to perform operation by adjusting his pressure to the pressure load required by the input apparatus 10.

Further, according to the present embodiment, the second load standard for receiving the second level input is not set unless the operator once operates to maintain the pressure (i.e., unless the pressure load Pr at the point Ar is determined). Therefore, the input apparatus 10 can have a certain time between start of processing for the first level input to end of it, i.e., before the reception of the second level input. It is thus possible to prevent disadvantageous start of the processing for the second level input before normal completion of the processing for the first level input, due to the "full pressing" at once by the operator.

Second Embodiment

Next, an input apparatus according to a second embodiment of the present invention will be described. The second embodiment of the present invention modifies the manner to determine the pressure load Pr at step S14 described with reference to FIG. 3 in the above first embodiment. Other than that, the second embodiment can be implemented in almost the same manner as the first embodiment. The input apparatus according to the second embodiment has the same configuration as the input apparatus 10 in the first embodiment but has a different processing and operation of the control unit 20 (and the load variation rate calculation unit 22). Hence, the same description as the above first embodiment will be omitted appropriately.

In the input apparatus 10 according to the second embodiment, it is the same as the first embodiment that the load variation rate calculation unit 22 calculates the temporal variation rate of the pressure load detected by the load detection unit 40. According to the second embodiment, however, the load variation rate calculation unit 22 further calculates an average variation rate of the pressure load from detection of the pressure load until detection of the pressure load satisfying the first load standard by the load detection unit 40. That is, in FIG. 4, the load variation rate calculation unit 22 calculates the average variation rate of the pressure load between the point A0 where the load detection unit 40 detects the pressure load P0 by the pressing input of the operator and the point A1 where the pressure load reaches the first load standard P1 as the operator increases the pressure of the input. This processing is carried out at step S11 in FIG. 3.

Subsequently, the notification information is generated at step S12, whereby the operator can recognize that the input reception processing of the first level input is carried out at step S13 and thus tries to maintain the pressure of the input (i.e., stops increasing the pressure).

According to the second embodiment, after detection of the pressure load satisfying the first load standard P1 by the load detection unit 40 (i.e., after the point A1), the load variation rate calculation unit 22 calculates the variation rate of the pressure load in a predetermined period. This "predetermined period" is set to 0.1 second, for example, which is suitable for the load variation rate calculation unit 22 to calculate the temporal variation rate of the pressure. Around the point Ar where the operator starts maintaining the pressure of the input, the variation rate of the pressure load in the above period calculated by the load variation rate calculation unit 22 is significantly reduced in comparison to the average variation rate of the pressure load between the point A0 and the point A1.

According to the present embodiment, at step S14, the control unit 20 thus compares the variation rate of the pressure load reduced in the above predetermined period and the average variation rate calculated by the load variation rate calculation unit 22. The control unit 20 determines the pressure load Pr adopting the pressure load where the variation rate of the pressure load in the above predetermined period is reduced down to be lower than the above average variation rate by a predetermined value or more as a result of the comparison. That is, according to the present embodiment, as shown in FIG. 4, the pressure load Pr is determined adopting the pressure load at the point Ar where the slope of the tangent of the curved line in a predetermined period after the point A1 is dramatically reduced down to be lower than an average slope of the curved line between the point A0 and the point A1 by the predetermined value or more.

According to the present embodiment, if the above "predetermined value" is set too small, even though the operator does not intend to maintain the pressure of the input, the point is regarded as the point Ar, resulting in determining the pressure load at this point as the pressure load Pr. Therefore, it is necessary to set the "predetermined value" a somewhat large value, avoiding a minimal value.

In this way, the present embodiment also suitably determines the pressure load Pr at the point Ar where the operator is assumedly maintaining the pressure of the input, thus achieving the same effect as the first embodiment.

Third Embodiment

Next, an input apparatus according to a third embodiment of the present invention will be described. The third embodiment, in the same manner as the second embodiment, modifies the manner to determine the pressure load Pr at step S14 described with reference to FIG. 3 in the above first embodiment. The input apparatus according to the third embodiment has the same configuration as the input apparatus 10 in the first embodiment but has a different processing and operation of the control unit 20 (and the load variation rate calculation unit 22). Hence, the same descriptions as the above first and second embodiments will be omitted appropriately.

According to the input apparatus 10 of the third embodiment, the load variation rate calculation unit 22, at predetermined intervals, calculates the temporal variation rate of the pressure load detected by the load detection unit 40. The "predetermined intervals" may be appropriate intervals such as every 0.2 second, for example, which allows the operator to detect a significant change in the pressure load of the input in comparison to the pressure load in a previous period.

According to the third embodiment, at step S11 in FIG. 3, the load variation rate calculation unit 22 calculates the variation rate of the pressure load at the predetermined intervals after the load detection unit 40 detects the pressure load satisfying the first load standard P1 (i.e., after the point A1). Around the point Ar where the operator starts maintaining the pressure of the input, the variation rate of the pressure load in the above predetermined period calculated by the load variation rate calculation unit 22 is significantly reduced in comparison to the variation rate in the previous period.

According to the present embodiment, at step S14, the control unit 20 thus compares the variation rate of the pressure load in a first predetermined period and the variation rate of the pressure load in a second predetermined period immediately before the first predetermined period, both of which are calculated by the load variation rate calculation unit 22. As the result of the comparison, the control unit 20 determines the pressure load Pr adopting the pressure load where the variation rate in the first predetermined period is reduced down to be lower than the variation rate in the second predetermined period by a predetermined value or more. According to the present embodiment, that is, as shown in FIG. 4, the pressure load Pr is determined adopting the pressure load at the point Ar where the slope of the tangent of the curved line in a predetermined period after the point A1 is reduced by the predetermined value or more in comparison to the slope of the tangent of the curved line in the previous period.

According to the present embodiment, if the "predetermined value" is set too small, even though the operator does not intend to maintain the pressure of the input, the point is regarded as the point Ar, resulting in determining the pressure load at this point as the pressure load Pr. Therefore, it is necessary to set the "predetermined value" to a somewhat large value, avoiding a minimal value.

In this way, the present embodiment also suitably determines the pressure load Pr at the point Ar where the operator is assumedly maintaining the pressure of the input, achieving for the same effect as the first and second embodiments.

Fourth Embodiment

Next, an input apparatus according to a fourth embodiment of the present invention will be described. According to the first to the third embodiments described above, as shown in FIG. 4, the pressure load for receiving the second level input is set based on the pressure load Pr at the point Ar where the operator starts maintaining the pressure after the load detection unit 40 detects the pressure load satisfying the first load standard P1 (i.e., after A1). According to the fourth embodiment, however, as shown in FIG. 5, a second load standard P2 for receiving the second level input is set based on a pressure load Pr' at a point Ar' where the operator once again increases the pressure of the input after maintaining it after the point Ar. Other than that, the input apparatus according to the fourth embodiment can be implemented in the almost same manner as the first to the third embodiments. The input apparatus according to the present embodiment has the same configuration as the input apparatus 10 described in the first to the third embodiments but has a different processing and operation of the control unit 20 (and the load variation rate calculation unit 22). Hence, the same description as each of the above embodiments will be omitted appropriately.

As shown in FIG. 5(A), it may happen that, after recognizing the reception of the first level input at the point A1, the operator inadvertently changes the pressure load thereafter against an intention to maintain it from the point Ar. This is because the operator maintains the pressure in the state of so-called "halfway pressing" to the input apparatus 10. Therefore, even though the operator intends to maintain a constant pressure, the pressure may be gradually reduced, in fact.

The graph of the pressure load shown in FIG. 5(A) shows a state that, despite the operator's intention to maintain the pressure of the input from the point Ar, the pressure is gradually reduced, and thus the pressure load detected by the load detection unit 40 is slowly decreased. In FIG. 5(A), a "fluctuation range" indicates the pressure load reduced (unintentionally by the operator) after the point Ar where the operator starts maintaining the pressure of the input as recognizing the reception of the first level input until the point Ar' where the operator starts increasing the pressure once again.

In contrast, as shown in FIG. 5(B), it may also happen that the pressure load is gradually increased, although the operator intends to maintain the pressure of the input from the point Ar after recognizing the reception of the first level input at the point A1. This is because the pressure may be unintentionally increased by degrees, although the operator intends to maintain a constant pressure.

The graph of the pressure load shown in FIG. 5(B) shows a state that, despite the operator's intention to maintain the pressure of the input from the point Ar, the pressure is gradually increased, and thus the pressure load detected by the load detection unit 40 is slowly increased. In FIG. 5(B), the "fluctuation range" indicates the pressure load increased (unintentionally by the operator) after the point Ar where the operator starts maintaining the pressure of the input as recognizing the reception of the first level input until the point Ar' where the operator starts increasing the pressure once again.

If the pressure is unintentionally reduced (or increased) by degrees as described above, it is considered that the operator is intending to maintain a constant pressure. In such a case, therefore, if the second load standard for receiving the second level input is set based on the pressure load Pr at the point Ar where the operator starts maintaining the pressure, the operator may feel the second load standard heavy (or light) contrary to his/her expectation.

That is, if the second load standard for receiving the second level input is set based on the pressure load Pr at the point Ar in FIG. 5(A), for example, the operator would feel heavy to make the pressing input with the pressure load satisfying the second load standard, as the actual pressure applied by the operator thereafter is somewhat reduced. In contrast, if the second load standard for receiving the second level input is set based on the pressure load Pr at the point Ar in FIG. 5(B), the operator would feel light to make the pressing input with the pressure load satisfying the second load standard, as the actual pressure by the operator thereafter is somewhat increased. Or in the latter case, the pressure being gradually increased may reach the second load standard set based on the pressure load Pr, causing the reception of the second level input against the operator's intention.

According to the present embodiment, therefore, the second load standard P2' for receiving the second level input is determined based on the pressure load Pr' at the point Ar' where the operator starts increasing the pressure once again, instead of the pressure load Pr at the point Ar where the operator starts maintaining the pressure.

According to the input apparatus 10 of the fourth embodiment, the load variation rate calculation unit 22 calculates the temporal variation rate of the pressure load detected by the load detection unit 40. Accordingly, the control unit 20 sets the point Ar' where the pressure load starts increasing after the point Ar where operator starts maintaining the pressure load, based on the variation rate of the pressure load calculated by the load variation rate calculation unit 22 after the load detection unit 40 detects the pressure load satisfying the first load standard P1.

That is, the control unit 20 sets the second load standard P2' based on the pressure load Pr' at a point (Ar') where the variation rate of the pressure load calculated by the load variation rate calculation unit 22 increases exceeding a second predetermined value after once being reduced down to a first predetermined value at the point Ar. Here, the "first predetermined value" is set based on the same technical idea as the "predetermined value" referred to when the variation rate of the pressure load is reduced down to the predetermined value or lower as described in the first embodiment. In addition, the "second predetermined value" is an appropriate value clearly distinguishable from the variation rate of the pressure load being gradually increased between the point Ar and the point Ar' shown in FIG. 5(B), for example, so that the control unit 20 appropriately determines the point Ar' where the pressure load significantly varies as the operator once again increases the pressure.

Figure 6:
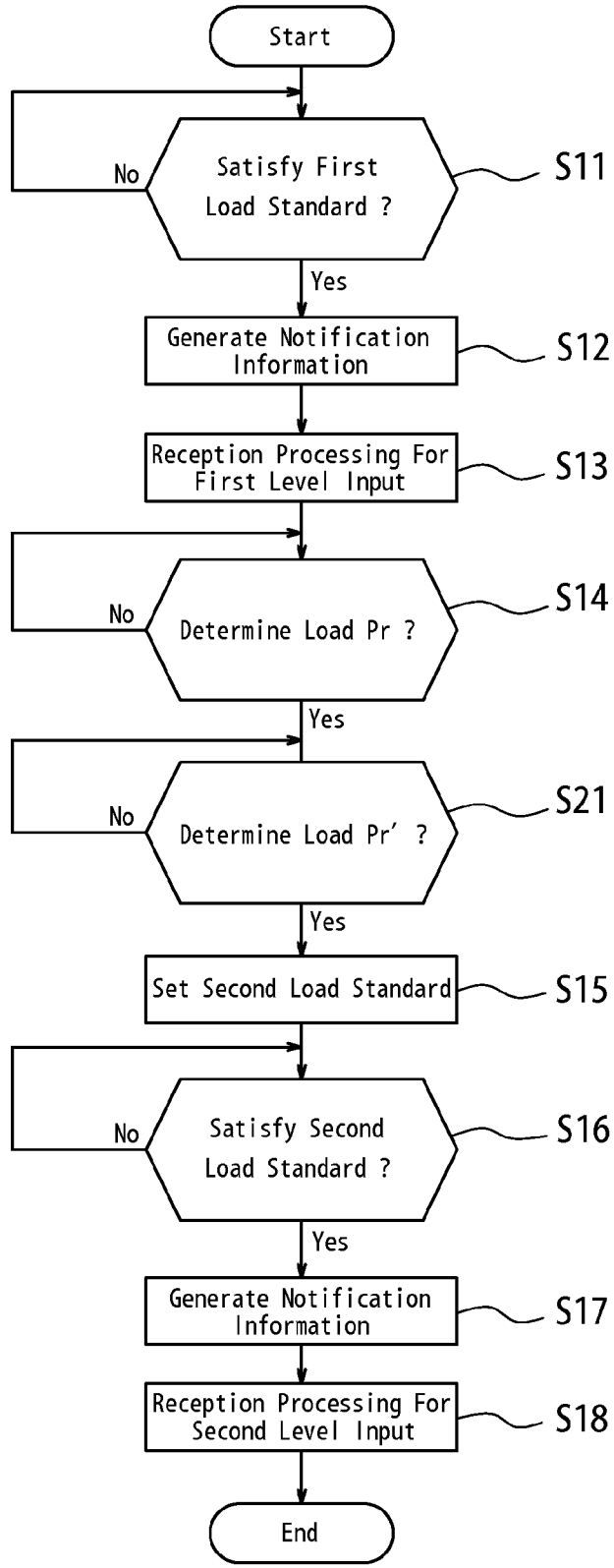
FIG. 6 is a flowchart illustrating an input reception process by the input apparatus according to the fourth embodiment.

Next, the input reception processing by the input apparatus 10 according to the present embodiment will be described. FIG. 6 is a flowchart illustrating the input reception processing by the input apparatus 10 according to the present embodiment. The flowchart shown in FIG. 6 is the same as the flowchart in FIG. 3 described in the first to the third embodiments, except a new step S21 inserted between the step S14 and the step S15. That is, subsequent to the determination on the pressure load Pr at the point Ar where the operator starts maintaining the pressure of the input at step S14, the control unit 20 determines whether the pressure load Pr' is determined (step S21).

If the pressure load Pr' is not determined at step S21, the input apparatus 10 turns into the waiting state. In contrast, if the pressure load Pr' is determined at step S21, the control unit 20 continues processing after step S15. That is, if the pressure load Pr' is determined at step S21, the control unit 20 sets the second load standard P2' for receiving the second level input adopting a result of addition of a predetermined addition width to the predetermined load Pr' (step S15). Processing thereafter is the same as that described with reference to the flowchart in FIG. 3, thus a description thereof will be omitted.

In this way, according to the present embodiment, the second load standard P2' for receiving the second level input is set based on the pressure load Pr' at the point Ar' where the pressure is increased once again. Accordingly, as shown in FIG. 5(A), if the operator unintentionally reduces the pressure by degrees from the point Ar where the operator starts maintaining the pressure, the second load standard P2 is set by adding the original addition width to the pressure load Pr' at the point Ar' where the pressure is increased once again. In addition, as shown in FIG. 5(B), if the operator unintentionally increases the pressure by degrees from the point Ar where the operator starts maintaining the pressure, the second load standard P2' is set by adding the original addition width to the pressure load Pr' at the point Ar' where the pressure is increased once again. In either case, thereby, the second load standard P2 for receiving the second level input is set based on the pressure varied despite the operator's intention to maintain it from the point Ar. It thus prevents the operator from feeling the second load standard for receiving the second level input heavy (or light) contrary to his/her expectation even if the pressure is varied unintentionally, which allows the operator to operate without feeling uncomfortable.

Fifth Embodiment

Next, an input apparatus according to a fifth embodiment of the present invention will be described. The input apparatus according to the fifth embodiment can be implemented by the same configuration as the input apparatus 10 of the fourth embodiment but has a different operation of the control unit 20 (and the load variation rate calculation unit 22). Hence, the same description as the above fourth embodiment will be omitted appropriately.

According to the fifth embodiment of the present invention, in the same manner as the fourth embodiment, the second load standard P2' for receiving the second level input is determined based on the pressure load Pr' at the point Ar where the operator once again increases the pressure. However, the fifth embodiment modifies the manner to determine the pressure load Pr' in the fourth embodiment. Here, according to the present embodiment, the manner to determine the pressure load Pr' is modified in the same manner as the second embodiment modifying the manner of the first embodiment to determine the pressure load Pr.

According to the input apparatus 10 of the fifth embodiment, the load variation rate calculation unit 22 calculates the temporal variation rate of the pressure load detected by the load detection unit 40, in the same manner as the fourth embodiment. According to the fifth embodiment, however, the load variation rate calculation unit 22 further calculates the average variation rate of the pressure load between detection of the pressure load and detection of the pressure load satisfying the first load standard by the load detection unit 40. That is, in FIG. 5, the load variation rate calculation unit 22 calculates the average variation rate of the pressure load between the point A0 where the load detection unit 40 detects the pressure load P0 of the pressing input by the operator and the point A1 where the pressure load reaches the first load standard P1 as the operator increases the pressure of the input. This processing is carried out at step S11 in FIG. 6.

Subsequently, the notification information is generated at step S12 in FIG. 6, whereby the operator can recognize that the input reception processing of the first level input is carried out at step S13 and thus starts maintaining the pressure of the input (i.e., stops increasing the pressure).

According to the fifth embodiment, after detection of the pressure load satisfying the first load standard P1 by the load detection unit 40 (i.e., after A1), the load variation rate calculation unit 22 calculates the variation rate of the pressure load in a predetermined period. This "predetermined period" is set 0.1 second, for example, which is suitable for the load variation rate calculation unit 22 to calculate the temporal variation rate of the pressure load. Around the point Ar where the operator starts maintaining the pressure of the input, the variation rate of the pressure load in the above period calculated by the load variation rate calculation unit 22 is once remarkably reduced in comparison to the average variation rate of the pressure load between the point A0 and the point A1.

According to the present embodiment, at step S14, the control unit 20 thus determines whether the variation rate of the pressure load in the above predetermined period calculated by the load variation rate calculation unit 22 is reduced down to a first predetermined value or lower. According to the present embodiment, that is, the point Ar is determined at step S14 where the slope of the tangent after the point A1 in FIG. 5 is significantly reduced down to the first predetermined value or lower. Here, the "first predetermined value" referred to in determination whether the variation rate of the pressure load is reduced down to first predetermined value or lower is a small value close to 0, for example, based on the same technical idea as the "predetermined value" described in the first embodiment, so that the control unit 20 can determine the point Ar where the operator starts maintaining the pressure by preventing increase in the pressure of the input.

When the point Ar where the pressure load Pr is detected is determined at step S14, the control unit 20 determines the pressure load Pr' at the point Ar' where the variation rate in the predetermined period calculated by the load variation rate calculation unit 22 is increased thereafter (step S21). According to the present embodiment, the control unit 20 compares the variation rate of the pressure load in the above predetermined period and the average variation rate of the pressure load calculated by the load variation rate calculation unit 22 in order to determine the point Ar'. The control unit 20 determines the pressure load Pr' adopting the pressure load at a point where a difference between the variation rate of the pressure load in the above predetermined period and the average variation rate becomes a second predetermined value or smaller as a result of the comparison. According to the present embodiment, that is, the pressure load Pr' is determined adopting the pressure load at the point Ar' where the slope of the tangent of the curved line in the predetermined period after the point Ar is increased such that a difference between the slope and the average slope of the curved line from the point A0 to the point A1 becomes the second predetermined value or smaller, as shown in FIG. 5. In other words, the pressure load Pr' is determined adopting the pressure load at the point Ar' where the slope of the tangent of the curved line in the predetermined period after the point Ar is increased to become, for example, almost the same as the average slope of the curved line from the point A0 to the point A1.

The "second predetermined value" according to the present embodiment is a small value close to 0, for example, such that the point where the average variation rate of the pressure load from the point A0 to the point A1 and the variation rate in the predetermined period after the point Ar become almost the same as each other is determined as Ar'.

In this way, the present embodiment also suitably determines the pressure load Pr' at the point Ar' where the operator once again increases the pressure of the input, achieving the same effect as the fourth embodiment.

Sixth Embodiment

Next, an input apparatus according to a sixth embodiment of the present invention will be described. The input apparatus according to the sixth embodiment can be implemented by the same configuration as the input apparatus 10 of the fourth and fifth embodiments but has a different operation of the control unit 20 (and the load variation rate calculation unit 22). Hence, the same descriptions as the above fourth and fifth embodiments will be omitted appropriately.

According to the sixth embodiment, in the same manner as the above fourth and fifth embodiments, the second load standard P2' for receiving the second level input is determined based on the pressure load Pr' at the point Ar' where the operator once again increases the pressure. The sixth embodiment modifies the manner to determine the pressure load Pr' of the fourth embodiment. Here, according to the present embodiment, the manner to determine the pressure load Pr' is modified in the same manner as the third embodiment modifying the manner of the first embodiment to determine the pressure load Pr.

According to the input apparatus 10 of the sixth embodiment, the load variation rate calculation unit 22, at predetermined intervals, calculates the temporal variation rate of the pressure load detected by the load detection unit 40. These "predetermined intervals", in the same manner as the "predetermined intervals" described in the third embodiment, may be appropriate intervals such as every 0.2 second, for example, which allows detection of a significant change in the pressure load of the input by the operator in comparison to the variation rate in a previous period.

According to the sixth embodiment, at step S11 in FIG. 6, the load variation rate calculation unit 22 calculates the variation rate of the pressure load at the predetermined intervals after the load detection unit 40 detects the pressure load satisfying the first load standard P1 (i.e., after A1). Around the point Ar where the operator starts maintaining the pressure of the input, the variation rate of the pressure load in the predetermined period calculated by the load variation rate calculation unit 22 is once remarkably reduced in comparison to the variation rate of the pressure load in the previous period.

According to the present embodiment also, in the same manner as the fifth embodiment, the control unit 20, at step S14, determines whether the variation rate of the pressure load in the above predetermined period calculated by the load variation rate calculation unit 22 is reduced down to the first predetermined value or lower. That is, according to the present embodiment also, at step S14, the point Ar is determined where the slope of the curved line after the point A1 in FIG. 5 is significantly reduced down to the first predetermined value or lower. Here, this "first predetermined value" is a small value close to 0, for example, in the same manner as the fifth embodiment, so that the control unit 20 can determine the point Ar where the operator starts maintaining the pressure of the input while preventing increase in it.

When the point Ar where the pressure load Pr is detected is determined at step S14, the control unit 20 compares the variation rate of the pressure load in the first predetermined period calculated by the load variation rate calculation unit 22 and the variation rate of the pressure load in the second predetermined period immediately before the first predetermined period. The control unit 20 determines the pressure load Pr' adopting the pressure load where the variation rate of the pressure load in the first predetermined period is increased to be higher than the variation rate of the pressure load in the second predetermined period by the second predetermined value or more, as a result of the comparison (step S21). According to the present embodiment, that is, the pressure load Pr' in FIG. 5 is determined adopting the pressure load at the point Ar' where the slope of the tangent of the curved line in the predetermined period after the point A1 is significantly increased exceeding the second predetermined value in comparison to the slope of the tangent of the curved line in the previous period.

According to the present embodiment, if the above "second predetermined value" is set too small, a point having a subtle change in the pressure load may be regarded as the point Ar, resulting in determining the pressure load at this point as the pressure load Pr'. In this case, the second load standard P2' for receiving the second level input is set, despite the operator's intention to maintain the pressure of the input. Therefore, it is necessary to set the "second predetermined value" to a somewhat large value, avoiding a minimal value.

In this way, the present embodiment also suitably determines the pressure load Pr' at the point Ar' where the operator once again increases the pressure of the input, achieving the same effect as the fourth and fifth embodiments.

Seventh Embodiment

Next, an input apparatus according to a seventh embodiment of the present invention will be described. The input apparatus according to the seventh embodiment can be implemented by the same configuration as the input apparatus 10 of the fourth to the sixth embodiments but has a different operation of the control unit 20 (and the load variation rate calculation unit 22). Hence, the same descriptions as the above fourth to the sixth embodiments will be omitted appropriately.

In the above fourth to the sixth embodiments, even if the operator unintentionally reduces the pressure by degrees from the point Ar where the operator starts maintaining the pressure, the second load standard P2' is determined by adding the original addition width to the pressure load Pr' at the point Ar' where the operator once again starts increasing the pressure. However, if the operator unintentionally reduces the pressure to a large degree from the point Ar where the operator starts maintaining the pressure, setting the second load standard P2' by adding the original addition width to the pressure load Pr' at the point Ar' makes the second load standard P2' very small. If the second load standard P2' for receiving the second level input after reception of the first level input is too small as described above, it may result in a reception of an unintended second level input due to a subtle fluctuation of the pressure of the input by the operator.

Figure 7:
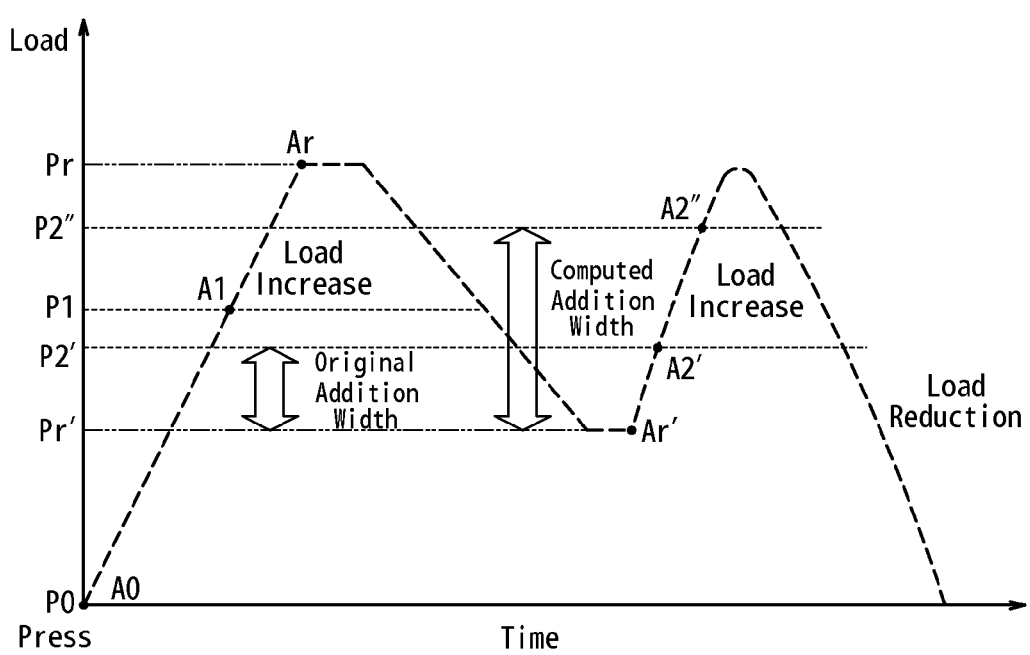
FIG. 7 is a graph illustrating variations in a pressure load detected by the load detection unit of the input apparatus according to a seventh embodiment.
Figure 8:
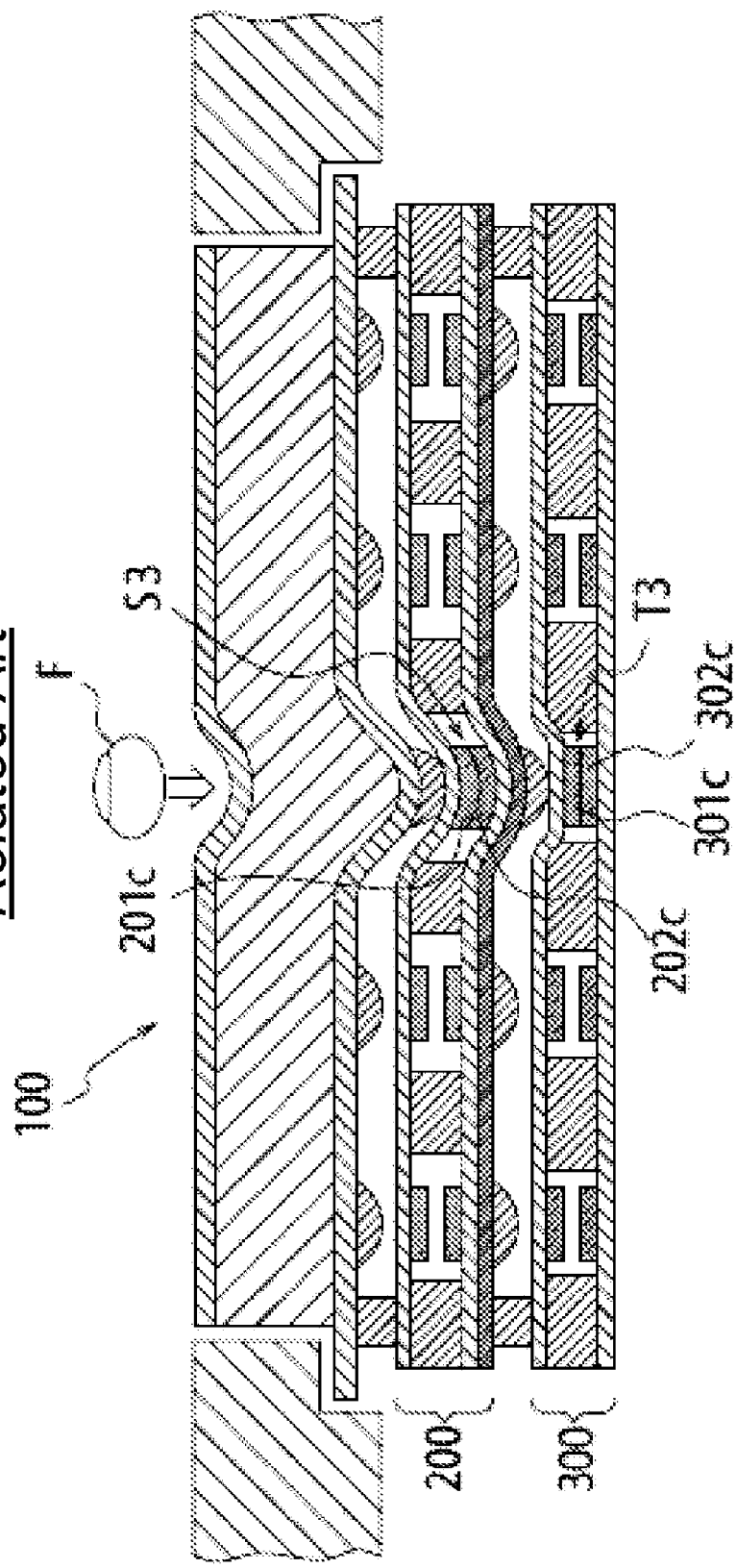
FIG. 8 is a cross-sectional view of a schematic internal structure of an operation apparatus according to a prior art.

According to the seventh embodiment, therefore, as shown in FIG. 7, if the pressure load Pr' at the point Ar' where the operator once again starts increasing the pressure is too small, a second load standard P2" is set by increasing the original addition width by an operation. In particular, if the second load standard P2' obtained by adding the pressure load Pr' at the point Ar' and the predetermined addition width is under the first load standard P1, the control unit 20 sets the second load standard P2" by increasing the addition width so as to exceed the first load standard P1.

In this way, even if the operator significantly reduces the pressure after reception of the first level input, the present embodiment prevents the reception of an unintended second level input due to the subtle fluctuation of the pressure of the input by the operator. According to the seventh embodiment, if the pressure load of the pressing input by the operator is reduced too much after the point Ar, it may no longer be suitable to regard it as the "halfway pressing" (for example, when the operator is moving the finger away from the input unit 34). Therefore, if the pressure load is reduced to a very small value close to 0, for example, after the reception of the first level input, it is desirable to set a lower threshold to reset the first level input once received.

The above input apparatus for receiving inputs of a plurality levels in accordance with the pressure loads of the pressing inputs by the operator can be used for various purposes in addition to the shutter button of the camera. For example, the above apparatus is applicable to water heaters or water supply equipment, to serve as a switch to adjust an amount of the hot/cold water to be supplied. That is, using the above input apparatus as a hot water supply button or a cold water supply button allows the operator to adjust the amount of the hot/cold water to be supplied in accordance with the pressure load on the button pressed by the operator. In particular, it is possible to supply a small amount of the hot/cold water by inputting with a light pressure, while increasing the amount of the hot/cold water to be supplied by increasing the pressure.

In addition, the input apparatus of the present invention may be assigned a variety of operations, such as adjustment of an amount (intensity) of the light or adjustment of power (the number of revolutions) of a motor, in accordance with the pressure load onto the input apparatus.

Further, the input apparatus for receiving inputs of plurality of levels in accordance with the pressure loads is also applicable to a button of an input device, such as a mouse. In this case, the "halfway pressing" of the button is assigned an operation corresponding to a single click, whereas the "full pressing" of the button is assigned an operation corresponding to a double click.

As described above, the input apparatus for receiving inputs of a plurality of levels in accordance with the pressure loads is suitable especially for adjustment of an amount in accordance with the pressure or for assignment of gradual processing in accordance with the pressure.

It is to be understood that the present invention is not limited to the embodiments set forth above but may be modified or varied in a multiple manner. For example, although the vibration unit 50 vibrates to provide the operator with the notification information upon reception of an input of each level in each of the above embodiments, the notification information does not need to be vibration but may take any form, so long as it informs the operator of a normal reception of an input to the input apparatus 10.

Accordingly, the notification information generation unit of the input apparatus according to the present invention can take any form, so long as it informs the operator of a normal reception of an input by generating the notification information which uses at least one of sound, vibration and display. In particular, when the pressure load detected by the load detection unit 40 satisfies the first load standard, the control unit 20 controls the notification information generation unit to generate the notification information. The same applies to the notification information when the second load standard is satisfied.

The notification information generation unit may be the audio output unit 70, instead of the vibration unit 50 as described above, to inform the operator of the notification information by generating predetermined sound. In addition, the notification information generation unit may be the display unit 32 or a display unit of another display to inform the operator of the notification information by displaying visually recognizable display. One or more of such notification information may be combined suitably. As described above, differentiating the notification information for reception of the first level input from that for reception of the second level input allows the operator to easily distinguish between the input levels.

In addition, although the first load standard P1 for receiving the first level input is assumed as a predetermined fixed value in each of the above embodiments, the first load standard P1 may be variable. In this case, for example, the control unit 20 stores a history of the pressure loads of usual pressing inputs by the operator detected by the load detection unit 40 in the memory unit 60 and sets the first load standard P1 for receiving the first level input based on the history of the pressure load. Preferably, the value of the first load standard P1 is not only a value set in advance but also a value suitably adjustable by the operator as necessary. In this way, if the operator feels uncomfortable with the first load standard P1 during operation, he/she can change setting thereof instantly to operate the input apparatus comfortably.

In the above descriptions, the value of the load standard is regarded as "the threshold of the pressure load", and it is determined that "the load standard is satisfied" if the pressure load reaches the value of the load standard. However, a condition to determine that "the load standard is satisfied" is not limited to the above state but may include multiple states. For example, it is also possible to determine that "the load standard is satisfied" when the pressure load of the pressing input to the input apparatus 10 by the operator exceeds the value of the load standard. In addition, it is also possible to determine that "the load standard is satisfied" when the pressure load indicating the value of the load standard is detected by the load detection unit 40.

Further, technical concepts termed by "by a predetermined value or more" and "by a predetermined value or lower" do not necessarily mean the mathematically strict sense of the words, but rather include either case inclusive of or exclusive of a criterial value depending on a specification of the input apparatus. For example, "by a predetermined value or more" may include not only an increasing value reaching the predetermined value but also the increasing value exceeding the predetermined value. Similarly, "by a predetermined value or lower" may include, for example, not only a decreasing value reaching the predetermined value but also the decreasing value falling under the predetermined value, i.e., the decreasing value under the predetermined value.

As described above, the second load standard P2 for receiving the second level input is set whenever the first level input is received according to the present embodiment. That is, the second level input is received if, before reception of a next new first level input, the pressure load detected by the load detection unit satisfies the second load standard P2 for receiving the second level input. It thus eliminates the need to keep the setting of the second load standard P2 where the second level input is received in a previous operation, enabling to avoid an erroneous operation (operation unintended by the operator) to receive the second level input, even if the operator applies a significant pressure at once.

REFERENCE SIGNS LIST 10 input apparatus
20 control unit
22 load variation rate calculation unit
30 touch panel
32 display unit
34 input unit
40 load detection unit
50 vibration unit
60 memory unit

The invention claimed is:

1. An input apparatus for receiving inputs of a plurality of levels in accordance with pressure loads, comprising:
a load detection unit configured to detect a pressure load of a pressing input; and
a control unit configured to control to set a second load standard for receiving a second level input whenever the load detection unit detects a pressure load satisfying a first load standard for receiving a first level input.

2. The input apparatus according to claim 1, wherein the control unit sets the second load standard for receiving the second level input based on a pressure load detected by the load detection unit after the first load standard is satisfied.

3. The input apparatus according to claim 1, further comprising a load variation rate calculation unit configured to calculate a temporal variation rate of the pressure load detected by the load detection unit, wherein
the control unit sets the second load standard based on a pressure load at a time when the variation rate of the pressure load is first reduced down to a predetermined value or lower after detection of the pressure load satisfying the first load standard by the load detection unit.

4. The input apparatus according to claim 1, further comprising a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein
the control unit sets the second load standard based on a pressure load at a time when the variation rate of the pressure load in a predetermined period, after detection of the pressure load satisfying the first load standard by the load detection unit, is reduced down to be lower than the average variation rate by a predetermined value or more.

5. The input apparatus according to claim 1, further comprising a load variation rate calculation unit configured to calculate, at predetermined intervals, a temporal variation rate of the pressure load detected by the load detection unit, wherein
the control unit sets the second load standard based on a pressure load at a time when the variation rate of the pressure load in a first predetermined period after detection of the pressure load satisfying the first load standard by the load detection unit is reduced down to be lower than the variation rate of the pressure load in a second predetermined period immediately before the first predetermined period by a predetermined value or more.

6. The input apparatus according to claim 1, further comprising a load variation rate calculation unit configured to calculate a temporal variation rate of the pressure load detected by the load detection unit, wherein
the control unit sets the second load standard based on a pressure load at a time when the variation rate of the pressure load after detection of the pressure load satisfying the first load standard by the load detection unit is increased up to a second predetermined value or higher after being reduced down to a first predetermined value or lower.

7. The input apparatus according to claim 1, further comprising a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein
the control unit sets the second load standard based on a pressure load at a time when the variation rate of the pressure load in a predetermined period after detection of the pressure load satisfying the first load standard by the load detection unit is increased, after being reduced down to a first predetermined value or lower, such that a difference from the average variation rate becomes equal to or less than a second predetermined value.

8. The input apparatus according to claim 1, further comprising a load variation rate calculation unit configured to calculate, at predetermined intervals, a temporal variation rate of the pressure load detected by the load detection unit, wherein
the control unit sets the second load standard based on a pressure load at a time when the variation rate of the pressure load in a first predetermined period after detection of the pressure load satisfying the first load standard by the load detection unit is increased to be higher than the variation rate of the pressure load in a second predetermined period immediately before the first predetermined period by a second predetermined value or more after being reduced down to a first predetermined value or lower.

9. The input apparatus according to claim 1, further comprising a notification information generation unit configured to generate notification information using at least one of sound, vibration and display, wherein
the control unit controls the notification information generation unit to generate the notification information when the pressure load detected by the load detection unit satisfies the first load standard.

10. An input method using an input apparatus for receiving inputs of a plurality of levels in accordance with pressure loads, comprising the steps of:
detecting a pressure load of a pressing input; and
controlling to set a second load standard for receiving a second level input whenever a pressure load satisfying a first load standard for receiving a first level input is detected at the step of detecting the pressure load.

11. The input apparatus according to claim 2, further comprising a load variation rate calculation unit configured to calculate a temporal variation rate of the pressure load detected by the load detection unit, wherein the control unit sets the second load standard based on a pressure load at a time when the variation rate of the pressure load is first reduced down to a predetermined value or lower after detection of the pressure load satisfying the first load standard by the load detection unit.

12. The input apparatus according to claim 2, further comprising a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein the control unit sets the second load standard based on a pressure load at a time when the variation rate of the pressure load in a predetermined period, after detection of the pressure load satisfying the first load standard by the load detection unit, is reduced down to be lower than the average variation rate by a predetermined value or more.

13. The input apparatus according to claim 2, further comprising a load variation rate calculation unit configured to calculate, at predetermined intervals, a temporal variation rate of the pressure load detected by the load detection unit, wherein the control unit sets the second load standard based on a pressure load at a time when the variation rate of the pressure load in a first predetermined period after detection of the pressure load satisfying the first load standard by the load detection unit is reduced down to be lower than the variation rate of the pressure load in a second predetermined period immediately before the first predetermined period by a predetermined value or more.

14. The input apparatus according to claim 2, further comprising a load variation rate calculation unit configured to calculate a temporal variation rate of the pressure load detected by the load detection unit, wherein the control unit sets the second load standard based on a pressure load at a time when the variation rate of the pressure load after detection of the pressure load satisfying the first load standard by the load detection unit is increased up to a second predetermined value or higher after being reduced down to a first predetermined value or lower.

15. The input apparatus according to claim 2, further comprising a load variation rate calculation unit configured to calculate an average variation rate of the pressure load between detection of the pressure load and detection of the pressure load satisfying the first load standard by the load detection unit, as well as calculating a temporal variation rate of the pressure load detected by the load detection unit, wherein the control unit sets the second load standard based on a pressure load at a time when the variation rate of the pressure load in a predetermined period after detection of the pressure load satisfying the first load standard by the load detection unit is increased, after being reduced down to a first predetermined value or lower, such that a difference from the average variation rate becomes equal to or less than a second predetermined value.

16. The input apparatus according to claim 2, further comprising a load variation rate calculation unit configured to calculate, at predetermined intervals, a temporal variation rate of the pressure load detected by the load detection unit, wherein the control unit sets the second load standard based on a pressure load at a time when the variation rate of the pressure load in a first predetermined period after detection of the pressure load satisfying the first load standard by the load detection unit is increased to be higher than the variation rate of the pressure load in a second predetermined period immediately before the first predetermined period by a second predetermined value or more after being reduced down to a first predetermined value or lower.

17. The input apparatus according to claim 2, further comprising a notification information generation unit configured to generate notification information using at least one of sound, vibration and display, wherein the control unit controls the notification information generation unit to generate the notification information when the pressure load detected by the load detection unit satisfies the first load standard.

* * * * *